May 20, 1952

J. KRUITHOF ET AL

COMMON CONTROL CIRCUIT FOR OPERATING SWITCHES REARWARD TO CALLING LINE 2,597,007

Filed Oct. 8, 1947

6 Sheets-Sheet 1

INVENTORS
JAKOB KRUITHOF
LADISLAS KOZMA
BY
Robert Harding Jr.
ATTORNEY

INVENTORS
JAKOB KRUITHOF
LADISLAS KOZMA
BY
Robert Harding Jr.
ATTORNEY

INVENTOR.
JAKOB KRUITHOF
LADISLAS KOZMA.
BY
Robert Harding Jr
ATTORNEY

May 20, 1952 J. KRUITHOF ET AL 2,597,007

COMMON CONTROL CIRCUIT FOR OPERATING SWITCHES REARWARD TO CALLING LINE

Filed Oct. 8, 1947 6 Sheets-Sheet 4

INVENTOR.
JAKOB KRUITHOF
LADISLAS KOZMA
BY
Robert Harding Jr.
ATTORNEY

INVENTOR.
JAKOB KRUITHOF
LADISLAS KOZMA
BY
Robert Harding Jr.
ATTORNEY

INVENTOR.
JAKOB KRUITHOF
LADISLAS KOZMA
BY Robert Harding Jr.
ATTORNEY

Patented May 20, 1952 2,597,007

UNITED STATES PATENT OFFICE 2,597,007

COMMON CONTROL CIRCUIT FOR OPERATING SWITCHES REARWARD TO CALLING LINE

Jakob Kruithof, Antwerp, Belgium, and Ladislas Kozma, Budapest, Hungary, assignors to International Standard Electric Corporation, New York, N. Y., a corporation of Delaware Application October 8, 1947, Serial No. 778,652
In the Netherlands March 31, 1942

Section 1, Public Law 690, August 8, 1946
Patent expires March 31, 1962

14 Claims. (Cl. 179—18)

This invention relates to automatic or semi-automatic telephone exchanges, in which several stages of switching equipment are provided to establish connections between a large number of subscribers' line circuits and a smaller number of register controllers or between like circuits.

In telephone exchanges the usual switching equipment comprises one or two stages of line finders, specially known as first and second line finders, which are provided in order to concentrate the traffic coming from the subscribers and to increase thereby the efficiency of the so-called "cord" or trunk circuits which are, due to the different circuit features incorporated, expensive equipments. The register circuit which is only required for establishing the wanted connection, is temporarily attached to the cord circuit by means of one or two connecting switches, so-called "register choosers," or cord choosers, or both, in which case they form part of a register link circuit.

The usual sequence of operation is that a first line finder is attached to the calling line, then a second line finder forming part of the cord circuit is engaged, and finally the switching equipment between the register and cord circuits is actuated. When in such systems backward hunting line finders and cord choosers without home positions are used, then several switches must be simultaneously started at each switching stage. The switch nearest the preceding calling circuit is used, whereby the switching time is reduced to the minimum. The disadvantages of such a scheme are that the repeated useless starting results in heavy wear of the switches, and that every circuit must be provided with complete hunting and testing equipment.

Heavy wear may, of course, be avoided by starting a single switch for each call. However, the starting of the nearest finder only is too complicated. It has been suggested to allocate several home positions at different points in the switch bank, and to use a common allotter designating the circuit which must answer the call. Several variations are possible, but they are all expensive and complicated, because they require backward hunting finders at each stage. Common control circuits containing the testing equipment would, of course, simplify such arrangements.

There are, however, many objections to control circuits which are provided in common for groups of connecting switches at each stage, and such common testing equipment is expensive, because special means are needed to attach it to the individual switching circuits.

The object of the present invention is a register connecting arrangement in which all the above-mentioned disadvantages are avoided.

According to one feature of the invention, a free controller circuit is connected with a calling line, or with a junction or group of lines, or junctions containing the calling line or junction whose identity is indicated by means of a signal or signals characteristic for such line, junction or group. The signal operates the controller circuit selectively to operate one switch each in at least some of the switching stages of the automatic connecting equipment. The signals characteristic for each line, junction or group bear a relationship to the manner of grouping these lines or junctions for the purpose of the selective operation, a distinct signal being employed for each selective operation. It follows that no control circuits are required at the different stages, and that there is only one switch hunting for a call at each stage. Furthermore, by providing the connecting switches with home positions and engaging them (as will appear from the detailed description) with certain preference, the switching time is considerably reduced on a high percentage of connections.

According to another feature, a group of lines or junctions requiring the same signal for determining the selection in the last but one switching stage giving access to this group is supplied with a common starting circuit. As many simultaneous signals are sent from the common starting circuit to the controller circuit as there are selective operations, each of these signals determining one of said selective operations. The last selecting operation determines the group in which the calling line or junction is located.

The specific embodiments of the invention depend on the type of subscriber's line circuit, on the switching scheme between the registers and cord circuits, and on the selection system. In the following description one example will be fully explained and the different aspects of the scheme will be outlined so as to facilitate alternative solutions.

In the drawings;

Fig. 1 is the junction diagram;

Fig. 2 discloses the type of the subscriber's line circuit used;

I. GENERAL DESCRIPTION

Figure 1:
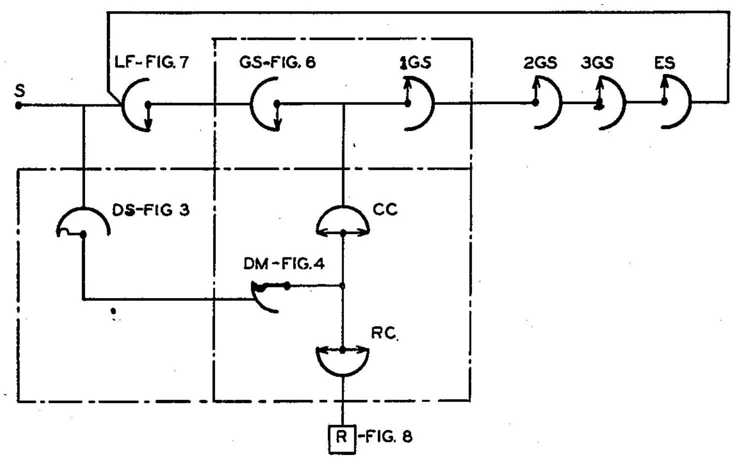

Referring to Fig. 1, 100 subscribers' line circuits, the directory numbers of which differ only in their tens and units digits, form one group and are served by one group of line finder circuits LF. Each group of line circuits has a starting circuit which comprises a permanently rotating call detector switch DS. The purpose of this starting circuit is to detect and to record the number of simultaneous calls in the group of 100 lines to which it is assigned.

Depending on the number of simultaneous calls, the starting circuit engages one or more register link circuits. These link circuits are provided in groups common to 1000 subscribers' lines having the same 1000's digit. One such group serves, therefore, 10 groups of subscribers' line circuits and thus has access to 10 starting circuits.

The link circuit designated to answer the call starts simultaneously the hunting action of the three switches belonging to it. The register chooser RC seizes the first free register circuit, the finder link chooser CC engages a free finder link circuit, and the detector connecting switch DM advances to a position which is marked by the calling starting circuit.

The finder link circuits, like the register links, form groups common to 1000 subscribers' lines. The registers are provided in large groups, practically common for the whole exchange.

As soon as all the three switches RC, CC and DM come to a rest, the register proceeds to control a selective operation by the group selector GS forming part of the finder link circuit. GS has access to 10 groups of LF circuits and it must engage a free circuit of that group which has access to the 100 subscribers' line circuits including the calling line. The register can direct GS to the wanted level by a signal which is sent via the switch DM from the starting circuit which has engaged the register link.

The seized line finder then starts to rotate under the control of the register until it finds a line circuit which is in calling condition. As soon as LF is stopped, the calling condition in the line circuit is removed and the starting circuit is released.

The register circuit is now connected to the calling subscriber's loop and the dialing of the wanted number may commence.

As it can be seen from the above, the register circuit requires only one signal in order to complete the register connection. If the switching stages are built up numerically, this signal must identify the 100's digit of the calling subscriber's number and is used to control the selection on the group selector GS. The line finder LF performs only a hunting action and requires no signal.

The scheme can be varied in different ways. The starting circuit may directly engage a register circuit so that the detector finder switch DM forms part of the register. The starting circuit must then produce two signals in addition to the one required for the selection by GS. Another signal must be produced (1000's digit) for the register to control a selective operation either in the switch CC, which must be converted into a selector or, alternatively, the register may selectively call for a free link circuit of that group out of 10, which is identified by said signal.

A further alternative is that a final selector replaces the line finder, in which case the register requires two additional signals identifying the tens and the units of the calling subscriber's number. These signals can be produced by the starting circuit only if the detector switch can stop on the terminal of the calling line or, alternatively, if the line circuit of the calling subscriber can produce these signals, and by certain means an interference between the signals of several simultaneously calling subscribers is prevented.

II. DETAILED DESCRIPTION

(1) *Call detection*

Figure 2:
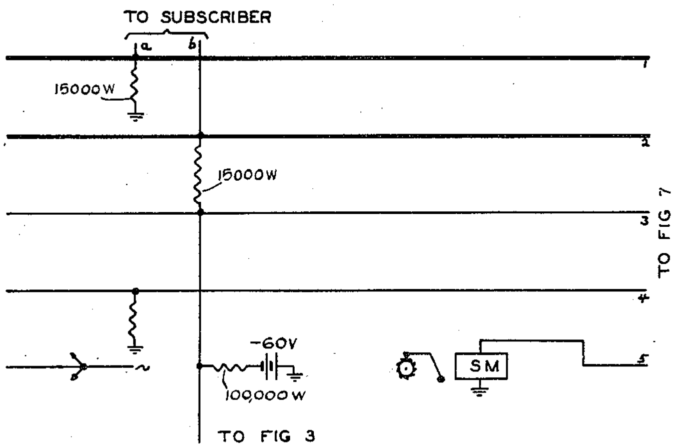
Figure 3:
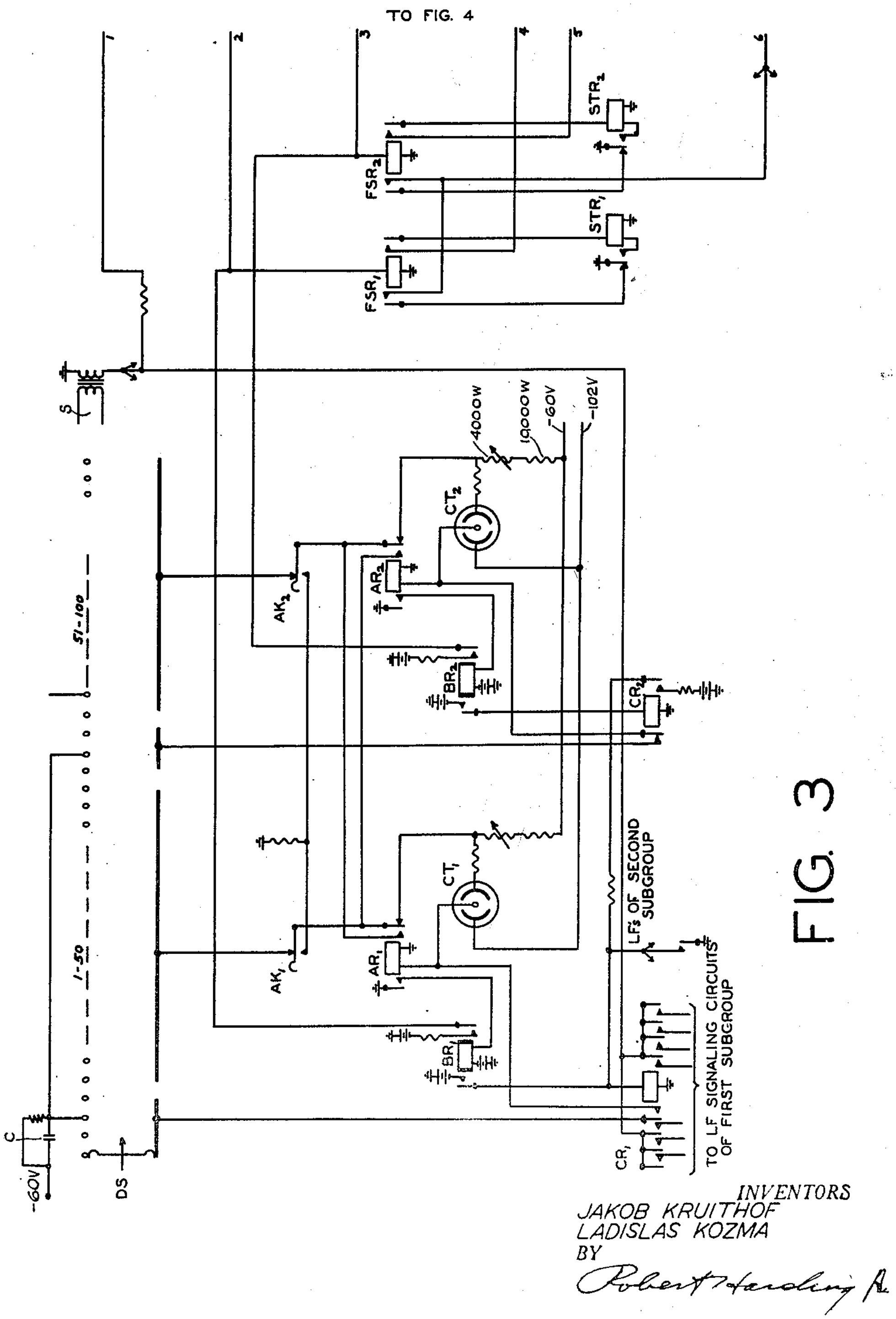
Fig. 3 shows the call detector circuit.

The subscriber's line circuit shown in Fig. 2 has no relays, only resistances. The *a* wire is grounded over 15,000 ohms, whereas the *b* wire is connected to a battery of $-60$ v. over 15,000+100,000 ohms resistance. The common point of these two resistances is connected to the arc of a permanently rotating switch, a call detector DS which together with its circuit is shown in Fig. 3. The potential of the common point mentioned is under idle conditions something near $-60$ v. When the subscriber removes his receiver and at the moment DS passes over the terminals of this line circuit, the potential will be near $-30$ v. owing to the resistances connected to $-60$ v. in the detector circuit (40,000+about 10,000 ohms). Systems of this kind are disclosed in U. S. Patent No. 2,295,032, filed January 30, 1942 and U. S. application Serial No. 485,262, filed April 30, 1943, now Patent No. 2,471,415, granted May 31, 1949.

One detector serves 100 subscribers and it wipes over the 100 terminals at a high speed, about four times per second. The whole arc is subdivided into 2 sectors, one for the subscribers 1 to 50 and the other one for 51 to 100. Each sector has its own detecting unit which is composed of a cold cathode tube $CT_1$, three relays $AR_1$, $BR_1$ and $CR_1$ and a few resistances.

The cold cathode tube which must detect a call, normally has a potential difference of $102-60=42$ v. across its control gap, but its breakdown voltage is 70 v. and the tube cannot ionize. When a calling terminal is passed by the brushes, this potential difference becomes $102-30=72$ v. The tube becomes ionized and a circuit is established via relay $AR_1$ and over the main gap of the tube to the battery of $-102$ v.

$AR_1$ energizes the slow releasing relay $BR_1$ and this in turn operates relay $CR_1$. The tube $CT_1$ remains ionized over its main gap over which the sustaining voltage is 75 v. Thus the potential drop on relay $AR_1$ is 27 v.

The bank of detector switch DS is so arranged that at the beginning of each group of terminals a circuit is closed via $CR_1$ front and a ½ mf. condenser C over which $-60$ v. is connected through the anode cathode circuit of the tube $CT_1$. The voltage on the main gap is reduced thereby to $-42$ v. and the tube becomes extinguished. Relay $AR_1$ releases but before relay $BR_1$ could release the wipers of detector switch DS again reach the calling terminals, whereupon the tube is ionized the second time, and relay $AR_1$ operates. Thus relay $AR_1$ operates once for each revolution of the detector switch DS and, consequently, relay $BR_1$ remains energized as long as the calling condition persists in the subscriber's line circuit.

Relay $AR_1$ operates if a call is detected in the first sector and relay $AR_2$ energizes for a call in the second sector. In addition, the circuit is so arranged that when relay $AR_1$ operates the terminals belonging to the first sector are tested by the second detecting unit and, similarly when relay $AR_2$ is operated, the first detecting unit is connected to the terminals of the second sector. The two units thus form an ideal group and can signal the presence of two calls originated by any two subscribers.

Figure 4:
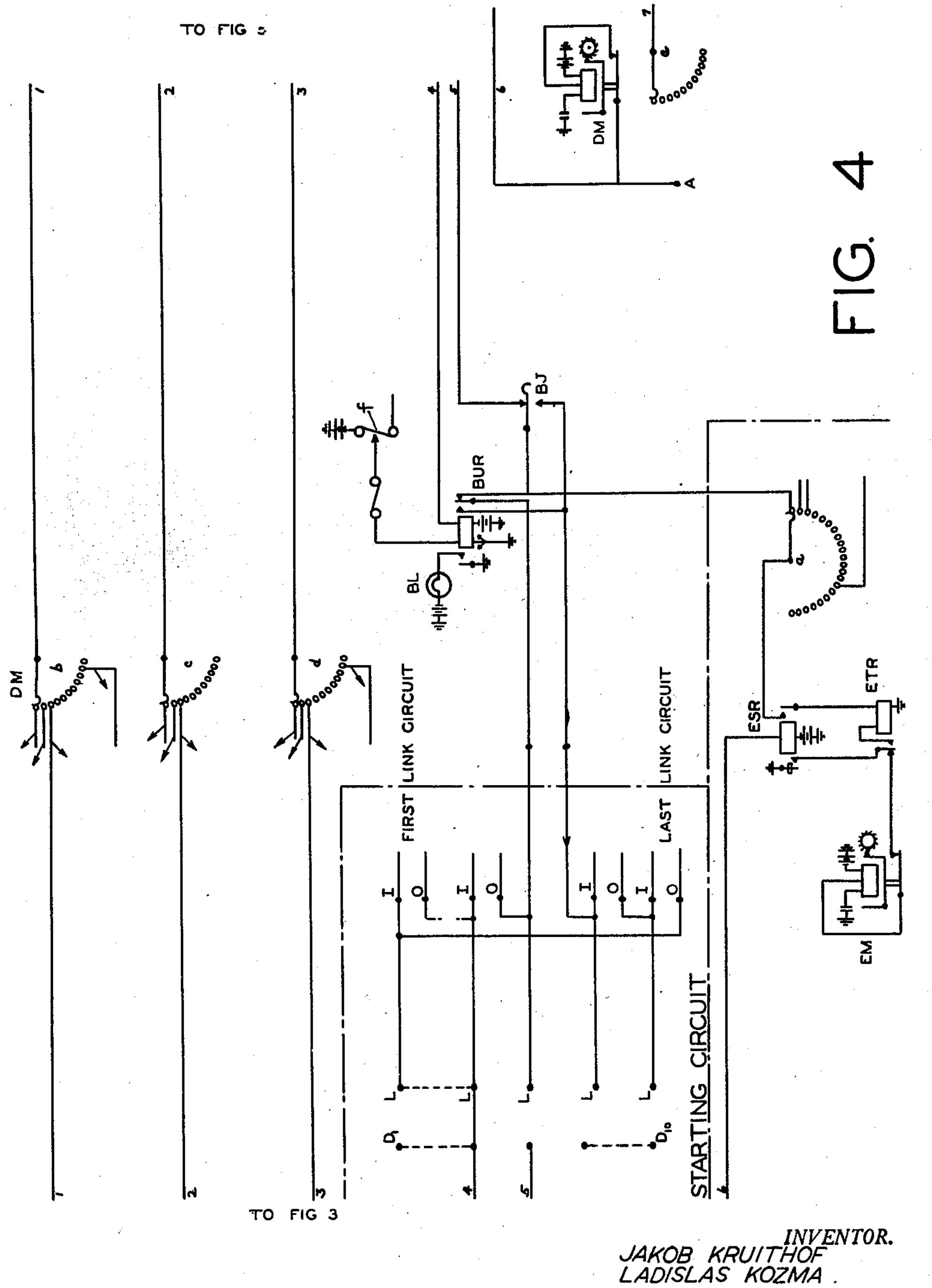
Fig. 4 shows the circuit of the detector finder.

Relays $BR_1$ and $BR_2$ connect test potential over 240 ohm resistances to the arcs *c* and *d* of the detector finder switches DM shown in Fig. 4 and at the same time operate the corresponding starting relay $FSR_1$ or $FSR_2$ in order to engage one register link circuit to answer the call.

(2) *Seizing of a register link circuit*

The link circuits are provided in ideal groups for 10 call detector circuits i. e. for 1000 subscribers. The links have access over the arcs *c* and *d* of the detector finder switch DM to all the twenty test potentials which may be connected from the detector circuits.

In order to reduce the switching time of the register link and finder link circuits (Figs. 4, 5 and 6), these are subdivided into several subgroups. To keep the description simple, it is assumed that there are only two such subgroups. Subgroup I includes those circuits in which the switch DM has its normal position on terminal 1, whereas the switches DM of the subgroup II are normally standing on terminal 6. The detector circuits 1 to 5 detecting calls in the first five groups of 100 subscribers will, as long as possible, employ the link circuits of the subgroup I. Similarly, the detector circuits 6 to 10, corresponding to the other five subscribers' groups, employ with preference the links of the subgroup II. In the same way, the finder link circuits are subdivided into two subgroups having two different home positions in their group selectors GS. Those of subgroup I are standing normally in front of the outlets leading to the line finders of the first 5 groups of 100 subscribers' lines, whereas the selectors GS of subgroup II have their home position in front of the outlets giving access to line finders of the last 5 groups of 100 subscribers' lines.

As previously stated, when a call is detected relay $BR_2$ operates relay $FSR_2$ and this connects relay $STR_2$ to a terminal $D_{1-10}$.

In the starting connections of a subgroup there are 10 such D terminals representing the 5×2 possible calling potentials. There are as many L terminals in the starting circuit as there are link circuits in the subgroup. The terminals D and L are interconnected in such a way that every D has one connection. The L terminals have connections depending on the number of link circuits required by the traffic. If there are less than 10 links, then some of the terminals L will be connected to two D terminals, whereas if there are more than 10 link circuits, then some of the L terminals will be without connection.

Each L terminal is connected to the starting relay STR of the corresponding link circuit. Relay $STR_2$ (Fig. 3), in the example chosen, operates in series with relay SOR (Fig. 5) and the former by introducing its low resistance winding renders this line circuit busy against other calls.

In case the link cicuit is already busy, relay BUR is operated and then the connection from terminal L is connected over the front instead of the back contact of BUR to the terminal L of the next circuit, and if this is busy, then BUR of the next circuit switches over to the terminal L of the following circuit, and so on. The relay BUR of the last circuit switches back to the first link circuit.

When all links of the subgroup are busy, relay STR cannot operate and, owing to this, relay ESR (Fig. 4) of the emergency starting circuit is energized. A step-by-step switch EM rotates to hunt for a free link circuit. Terminals *a* of EM are connected to the starting relays SOR (Fig. 5) of the link circuits of both subgroups. Relay ESR connects the test relay ETR to wiper *a*, and switch EM is driven until it finds the terminal of the first free link circuit.

A link circuit can be made busy by the plugging-up of the busy jack BJ, in which case the connection of the L terminal is changed over to the next circuit by contacts of the jack. The link can also be automatically isolated if, for example, the fuse *f* of the circuit is blown, in which case relay BUR operates over its left winding.

The register links and the finder link circuits can be subdivided into as many subgroups as are found to be advantageous for the switching time. If there are three subgroups, for example, the switches CC and GS have three different home positions corresponding to the three subgroups. The detector circuits are similarly divided in three groups (4+3+3, for instance) and each subgroup seizes, with preference, the link circuits of the corresponding subgroup as long as a circuit is available.

(3) *Hunting of the switches in the link circuit*

When relay SOR (Fig. 5) operates, all the three switches DM, CC and RC belonging to the link circuit start to rotate. The detector finder switch DM picks up the calling test potential of the detector circuit, the register chooser RC seizes the first free register circuit, and the finder link chooser CC hunts for an idle finder link circuit.

The driving circuit of DM is as follows (Figs. 4 and 5): Ground, back contacts of relays LFR, DTR, $DTR_2$ and LBR, front contact of relay SOR, interrupter and winding of switch DM to battery. Relay SOR connects to the test circuit relay $DTR_1$ via brush *c* and relay $DTR_2$ via brush *d* of switch DM. Relay $DTR_1$ operates on test potentials of relays $BR_1$, and $DTR_2$ on those of $BR_2$ of the detector circuit. Switch DM stops when either one of the test relays operates. Relay DTR energizes its helping relay DDR which by introducing the low resistance winding of relay DTR renders the test potential busy against other link circuits.

Relay DDR operates relay LBR and this in turn energizes relay BUR (Fig. 4). The right outer front contact of relay LRB puts a full ground on relay SOR so that the holding of the link circuit is taken over from the starting circuit to the test potential found by switch DM. At the same time, the low resistance winding of relay DTR shunts out relay FSR of the detector circuit (Fig. 3) whereby the circuit that originally seized relay SOR is disconnected.

The finder link chooser CC is energized via the second right front contact of SOR and the back contacts of relays CTR, THR and LFR. The test relay CTR is connected via right outer front contact of relay SOR to the test brush *g* to stop CC as soon as the test potential of the first free finder link circuit is found Relay CDR, introduced into the low resistance test circuit, is a marginal relay which guards against double test in the known manner.

The finder link chooser switches CC have two different home positions, depending on the subgroup of which they form part. Those of the first subgroup engage with preference such finder link circuits which have their group selector GS standing in front of the first group line finders, whereas the CC switches of the second subgroup start to hunt over the test potentials of such finder link circuits which have their group selectors standing in front of the 6th line finder group.

The register chooser RC energizes via the right inner front contact of relay SOR and the back contacts of relay RTR and THR. The test relay RTR is connected via the second right front contact of relay SOR to the test brush *g* to stop RC as soon as the terminals of a free register are reached. Relay RDR is the customary marginal relay guarding against double test.

When all the three hunting operations are terminated, i. e. relays LBR, CDR and RDR are operated, a circuit is closed for relay TCR via the front contacts in series of these three relays. This and its helping relay THR establish all connections between the register and the finder link circuits required for further operations.

The link circuit is held at present by relay LBR which is kept operated from the test potential of the detector circuit by means of the intermediary relays DTR and DDR. The register and the finder link circuits are held over the test brushes *g* of the finders RC and CC, respectively.

(4) *Group selection*

Figure 8:
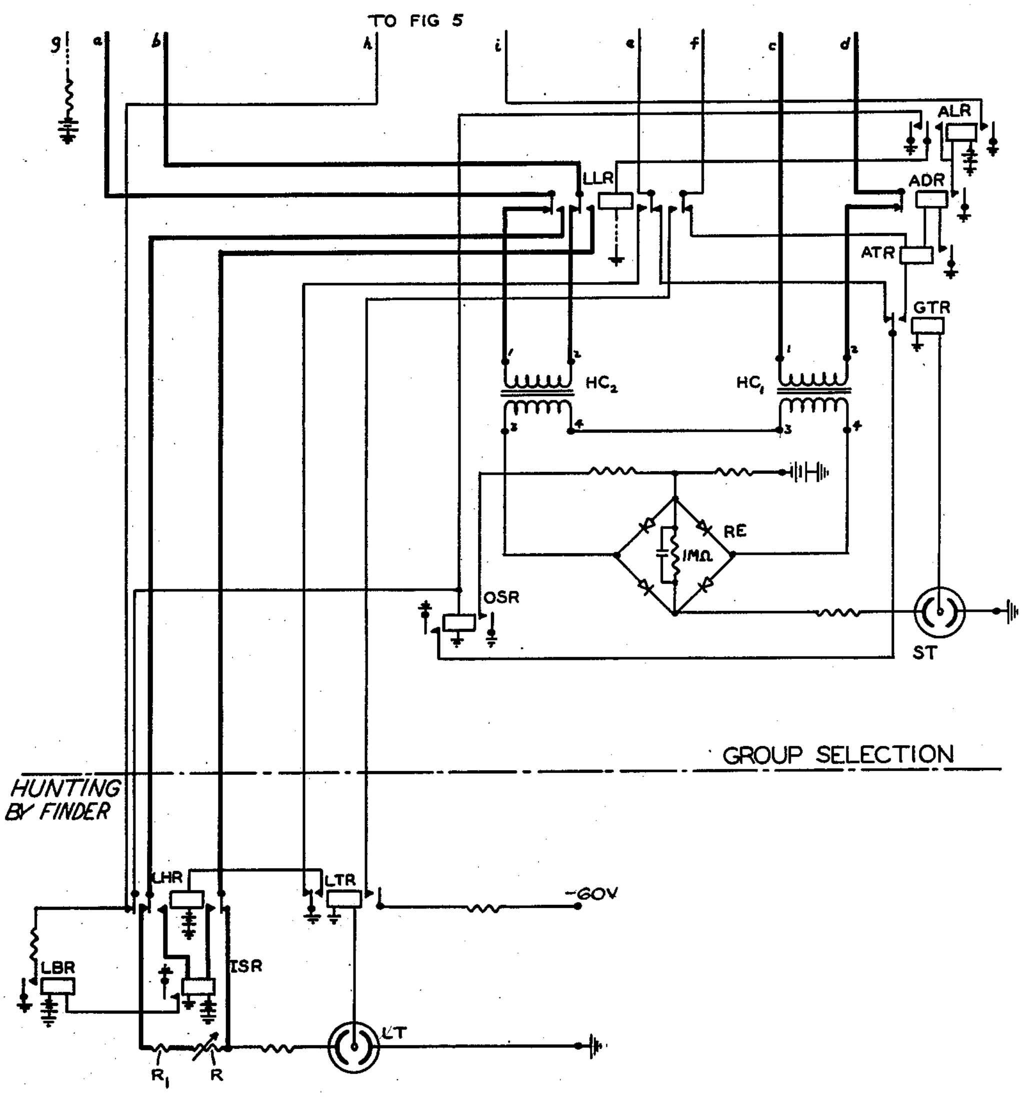
Fig. 8 shows parts of the originating register circuit.

Fig. 8 shows that part of the register circuit which controls the selection of the group selector GS forming part of the finder link circuit. The basic principles of the system, by which the selections are accomplished are described in U. S. Patent No. 2,452,578, dated November 2, 1948. The selection is based on the comparison of two alternating current sources, one being the so-called "signaling" current, and the other the so-called "reference" current. Both may have 12 different phase values. The register has a signaling or detecting unit which responds only if the above two currents have a certain predetermined relationship to one another. The signaling current is received from the line finder circuits and each group of line finders is characterized by a different phase. The reference current determines the level to be selected. In the present case it is furnished by the detector circuit to which the link circuit is attached.

Figure 5:
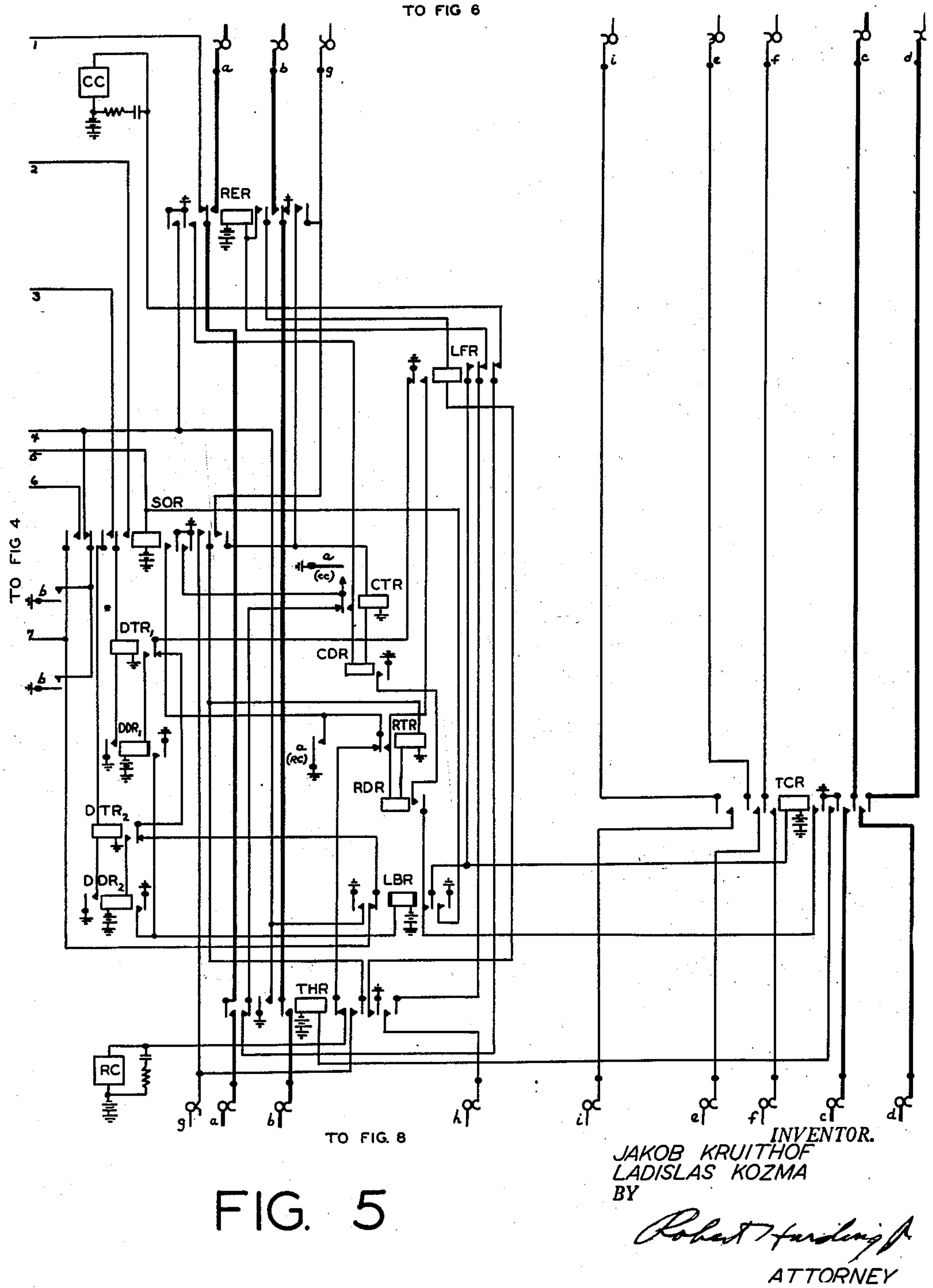
Fig. 5 shows those parts of the originating register link circuit which are needed to explain the invention.
Figure 6:
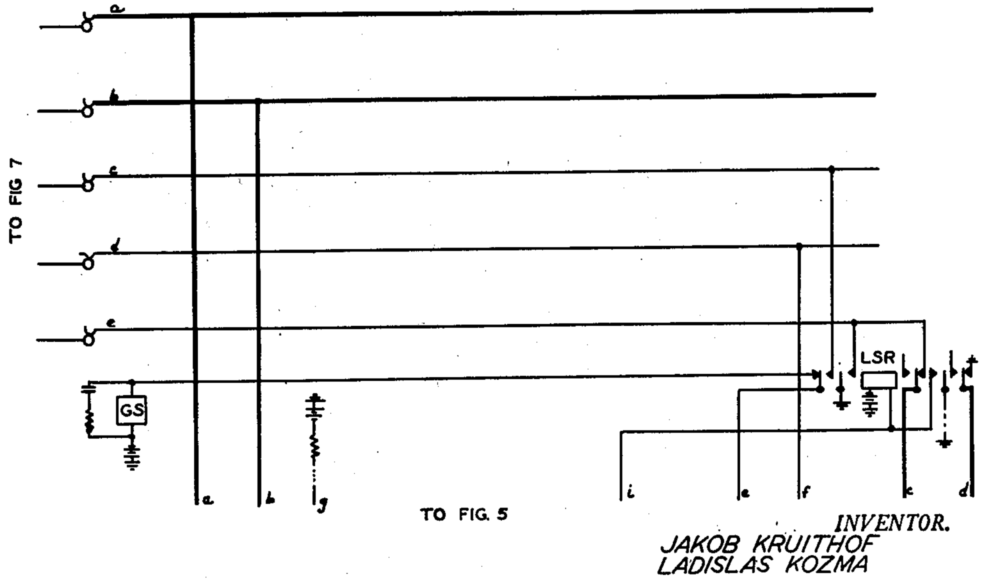
Fig. 6 shows in a similar way parts of the finder link circuit.

As soon as relay THR of the link circuit (Fig. 5) operates, relay OSR of the register (Fig. 8) energizes in series with relay RER of the link circuit (Fig. 5) via LFR back and brush *h*. Only relay OSR operates, its resistance being sufficiently high so that relay RER cannot operate. Relay OSR closes the driving circuit of the group selector via back contacts of relay GTR and LLR, brush *e* of RC, front contact of relay TCR, brush *e* of CC and back contact of relay LSR (Fig. 6). The group selector GS starts to rotate and its brush *e* hunts for the alternating current test potentials of the line finders.

Figure 7:
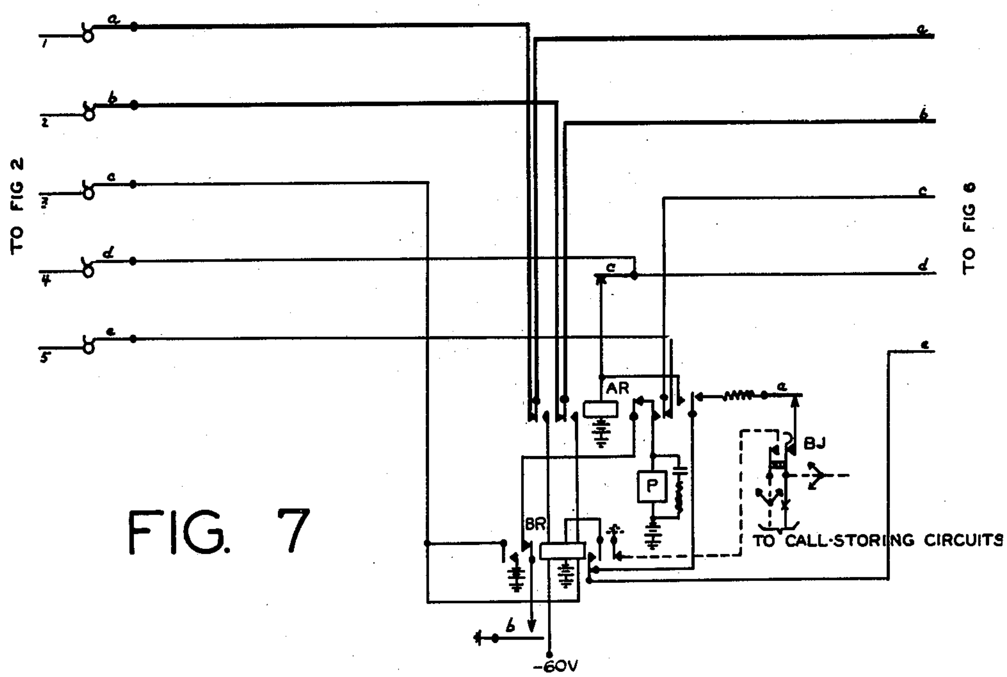
Fig. 7 shows the line finder circuit.

In the line finder circuits the alternating current signaling current is controlled over contacts of relays and over the busy jack BJ, (Fig. 7), so that the current is applied to the *e* terminal but only when the line is free. The line finders are also subdivided into two subgroups, and the alternating current potentials of the circuits belonging to the first subgroups are controlled in the detector circuit (Figs. 3 and 7). The signaling current is applied to the brush *e* of selector switch GS (Fig. 6) right inner back contact of relay LSR, brush *c* (Fig. 5) of finder link chooser CC, third right front contact of relay TCR, brush *c* of register chooser RC, the transformer $HC_1$, and a return lead *d* in a parallel circuit to ground at the right back contact of relay LSR in the finder link (Fig. 6) to ground. The reference current is connected from a source S in Fig. 3 over conductor 1 to the arc *b* of the detector finder switch DM (Fig. 4) and then via brush *b* of DM, left inner back contact of relay RER (Fig. 5), left outer front contact of relay THR, brush *a* of RC, left outer back contact of relay LLR (Fig. 8), the transformer $HC_2$ and over conductor *b* back to ground at RER (Fig. 5).

The secondary windings of the transformers $HC_1$ and $HC_2$ are connected in opposition and the induced resulting current is rectified by the bridge RE (Fig. 8) and conducted over a resistance of 1 megohm which is in the control gap circuit of the cold cathode tube ST. The potential across the control gap of ST is, after the operation of OSR, 130—50=80 v., but on account of the presence of the alternating currents, the potential is increased by some 30 v., so that 80—30=50 v. will be applied to the tube which, therefore, cannot ionize.

When the selector GS reaches the terminal of a line finder circuit (Fig. 7) with an alternating current test potential of the same phase as the reference current in the detector circuit, then the induced currents will tend to cancel and the potential drop across the resistance of the bridge RE caused by the alternating currents will be removed and the voltage across the tube ST rises. The tube ST fires and current flows via the anode of the tube to operate relay GTR and stop the group selector.

The condenser of 1000 cm. connected in parallel to the resistance of 1 megohm in the bridge RE smooths out the ripples of the alternating current.

Relay GTR introduces relay ATR and then a regular double testing is carried out. The signaling unit itself cannot prevent the double seizure of a line finder circuit. The test potential is controlled by the relay AR of the line finder circuit (Fig. 7). Relay ATR (Fig. 8) operates with its high resistance winding over the right outer back contact of relay LLR, brush *f* of RC left inner front contact of relay TCR (Fig. 5) brush *f* of switch CC, brush *d* of selector GS (Fig. 6), the home contact *c* of the line finder (Fig. 7) and relay AR to battery. Relay ATR (Fig. 8) introduces relay ADR in series with its low resistance winding and the operation of ADR signifies a successful testing. Relay ADR energizes relay ALR which prepares a lock circuit for itself in series with relay LLR. Relay ALR operates relay LSR of the link finder circuit (Fig. 6). Relay LSR connects a full ground for the line finder circuit (Fig. 7).

In the meantime relay AR of the line finder has been energized in series with the low resistance windings of the test relays. Relay AR locks itself to the left inner front contact of relay LSR via the brush *e* of selector GS. This holding ground short circuits the test relays. Relay ADR releases and now relay LLR operates and switches over the wires $a$, $b$, $e$ and $f$ from the circuit of the group selection control to the circuit for the control of the line finder hunting.

Relay ALR (Fig. 8) connects a full ground to wire $h$ with the result that relay RER of the link circuit (Fig. 5) operates, disconnects the reference current and connects the $a$ and $b$ wires towards the line finder. Relay OSR (Fig. 8) releases.

Each group of line finders is subdivided into two subgroups distinguished by two different home positions. The first group has its home position in front of the subscriber's line circuits 1 to 50 and the second subgroup before the lines 51 to 100. The signaling currents of the line finder circuits forming part of subgroup I are controlled over front contacts of relay $CR_1$ in the detector circuit (Fig. 3) and are thus applied only if a call is detected in the group of subscribers' lines 1 to 50. The signaling currents of the circuits of subgroup II are not controlled in the above way since they are in any case second choice circuits.

The group selector GS will, therefore, engage with preference that one of a group of line finders which has to make a maximum of one-half a revolution to reach the calling line circuit. If all the circuits of subgroup I are busy, then the group selector will automatically engage a free circuit of subgroup II. On the other hand, if the circuits of subgroup II are all occupied and a call is detected in the group of lines 51–100 and relay $CR_2$ is operated, then relay $CR_1$ is energized by $CR_2$ in a circuit shown in Fig. 3. The group selector will engage a free circuit in subgroup I.

If calls are detected simultaneously in both subgroups, then the group selectors cannot be prevented of seizing, if available, line finder circuits of the subgroup I.

The detector circuits can be provided, if found desirable, with three detecting units connected to three sectors of the detector switch. If unit I is operated, then a new call in sector I operates the unit II etc. so that the three units form an ideal group. Each group of line finders can similarly be split into three subgroups and their alternating current test potentials may be controlled over relays CR of the detecting units so that the group selectors will engage with preference such line finders which have to rotate a maximum of one third of their arc to reach the calling line.

(5) *Hunting of line finder*

When relays AR (Fig. 7), LSR (Fig. 6), RER (Fig. 5) and LLR (Fig. 8) are all energized, the line finder (Fig. 7) starts to rotate. Its operating circuit passes via left back contact of relay LTR (Fig. 8), right inner front contact of relay LLR, brush $e$ of RC, second left front contact of relay TCR, brush $e$ of CC, left front contact of relay LSR (Fig. 6), brush $c$ of GS, second right front contact of AR (Fig. 7) and the winding of the power magnet P to battery.

In the test circuit for the hunting operation the tube LT (Fig. 8) has the same function as the tube ST in the group selection. The $c$ wire of the calling subscriber's line circuit is reached via the brush $c$ of the line finder, one winding of relay BR, contacts and brushes in the $b$ wire, the resistances R and $R_1$ of 20,000 and 40,000 ohms (Fig. 8) and the return over the $a$ wire and another winding of relay BR (Fig. 7) to battery of −60 v. The two windings of relay BR are connected differentially and thus they present only an additional non-inductive resistance in the test circuit.

When the line finder reaches the $c$ terminal of the calling line, the potential of the $b$ wire drops to some −30 v. and the tube LT fires. Relay LTR operates and stops the line finder on the line circuit of the calling line. Relay LTR operates relay LHR which connects the instepping relay ISR to the $a$ and $b$ wires. The ground over the winding of relay ISR energizes relay BR in the line finder circuit (Fig. 7) over the $a$ wire. Relay BR locks itself over a third winding to the holding ground of LSR on the $e$ brush of GS. Relay BR releases relay AR which then connects the instepping relay to the $a$ and $b$ wires of the subscriber's loop.

Relay LHR (Fig. 8) opens the operating ground of relay RER (Fig. 5) which now locks itself over relay LFR. At this moment the control of the connection has to be taken over by the register. Due to the operation of relay LFR relays DDR, LBR and SOR release in sequence. During this time relay ISR (Fig. 8) in the register operates and relay LBR energized by relay ISR puts back a ground on the $h$ wire to replace the energizing ground of relay TCR. In this way, after the release of relay LBR, the register keeps relay TCR energized and holds thereby the link circuit during the sending in of the wanted subscriber's number.

Since one finder is hunting only for one call and the number of simultaneous rotating finders is, owing to the detector circuit, limited to two, the probability of a double test is extremely remote. Nevertheless, the testing circuit of the line finder is so designed that two such circuits cannot operate in parallel. The test potential on the $c$ wire of the subscriber's line circuit is reduced to −30 v. at the moment the test circuit is connected to it and the potential across the control gap is increased to 72 v. i. e. above the breakdown voltage. If there are two test circuits in parallel, the voltage of the $c$ wire drops only to −36 v. and then the voltage across the control gap will be only 66 v., thus below the breakdown voltage and none of the tubes will operate. The operating time of the tube is only a fraction of a millisecond and, once ionized the tube remains independent by the test circuit in operated conditions. Therefore, such double tests are unlikely to occur.

The subscriber's $d$ wire is used to signal the final selector that the subscriber is busy. The busying battery of −60 v. is connected via the right front contact of relay LTR (Fig. 8).

Relay BR in the line finder circuit (Fig. 7) connects full battery to the $c$ wire of the line circuit, increasing the potential thereon to −48 v. so that the calling condition is removed. The detecting unit on the next passing by of the detector switch will not be operated and thus the calling test potential holding the register link circuit is disconnected. Relay DDR (Fig. 5) is slower than relay BR in the detector circuit (Fig. 3), so that first the calling potential and then the busying test relay DTR is disconnected.

At the moment that the holding of the connection is taken over by the register, the register link circuit has to remove the test relay DTR from the tested terminal on the switch DM because the test potential may be maintained thereon by another call. The persisting test potential will engage a new link circuit as soon as relay DDR releases and opens the low resistance winding of relay DTR.

In case two calls are simultaneously originated in the same group of 50 lines, one of the detecting units operates in overflow. When the first call is answered by a register, the overflow detecting unit is released and the call which is still unanswered will act on the detecting unit belonging to the sector. The calling potential holding the link circuit is disconnected in the overflow detecting unit and in its stead, the test potential of the other unit is made free for testing. The holding of the link circuit in such a case has to be shifted from one DTR relay to the other one. The releasing time of relays DDR and LBR must cover the delay by which the test potential of the first unit is freed from the other link circuit (DDR alone).

What is claimed is:

1. In an automatic telecommunication system, a plurality of lines arranged in groups, a lesser number of control circuits common to said lines, automatic connecting equipment comprising at least one switching stage for establishing connections between any line and a free control circuit, means independent of said switching stage for taking into use a free control circuit and for sending a characteristic signal indicating to said control circuit the identity of the group of a calling line, and means in the control circuit taken into use and responsive to said signal for selectively operating said automatic connecting equipment.

2. In an automatic telecommunication system, a plurality of lines arranged in groups, a lesser number of control circuits common to said lines, automatic connecting equipment comprising a group selector for establishing connections between any calling line and a free control circuit, means independent of said group selector for taking into use a free control circuit and for sending a characteristic signal indicating to said control circuit the identity of the group of a calling line, and means in the control circuit taken into use and responsive to said signal for selectively operating said group selector.

3. The system according to claim 2, further comprising a line finder for each group of lines and means in the control circuit for operating the line finder selected by the group selector.

4. In an automatic telecommunication system, a plurality of groups of lines, a lesser number of control circuits common to said lines, automatic connecting equipment comprising a line finder and a group selector connected in series for establishing connections between any calling line and a free control circuit, means independent of said group selector for taking into use a free control circuit and for sending a characteristic signal indicating to said control circuit the identity of the group of a calling line, means in the control circuit taken into use and responsive to said signal for controlling the group selecting operation of the selector to select the group of the calling line, and means in said control circuit for operating the line finder for selecting the calling line in the selected group.

5. The system according to claim 4, in which the means for taking into use an idle one of the control circuits comprises a starting circuit operative upon the initiation of a call.

6. The system according to claim 4, further comprising selector switches for connecting said group selector with the called line, and means in the control circuit taken into use for controlling said selector switches in accordance with the designation of the called line.

7. In an automatic telecommunication system, a plurality of groups of lines, a lesser number of control circuits common to said lines, a group of automatic connecting equipments each comprising a finder link circuit and a plurality of switching stages for establishing connections between any calling line and a free control circuit, means independent of said finder link circuit for taking into use a free control circuit and for sending characteristic signals indicating to said control circuit the identity of the group of a calling line, and means in the control circuit responsive to said signals for selectively operating said automatic connecting equipment.

8. The system according to claim 7, and in which the means for sending the signals comprises a starting circuit, and means operative upon the initiation of a call for connecting said starting circuit with a calling line and with a free control circuit.

9. The system according to claim 7, a starting circuit, common for a group of lines, comprising means for supplying continuously said signals indicating the group of calling lines, and means in the starting circuit to engage and hold as many control circuits as there are waiting calls in the group.

10. In an automatic telecommunication system, a plurality of groups of lines, a group of control circuits common to several groups of lines, each control circuit comprising a register, automatic connecting equipments each comprising a line finder, a group selector and a finder link circuit, register link circuits each having three finder switches, a starting circuit for each group of lines connected to a register link, means operable under control of said register link for starting one finder switch to hunt for said starting circuit, the second finder switch to hunt for a free register and the third finder switch to hunt for a free finder link circuit, means operative upon the completion of the three hunting operations for actuating the selected register to control said group selector to select a line finder serving the group to which the calling line belongs, means controlled by the register to control the selected line finder to seize the calling line, and means operative thereupon for releasing the starting circuit and for holding the selected register under the control of the calling line.

11. The system according to claim 10, and in which each group of register link circuits is divided into a plurality of subgroups, the finder link circuit finders of each subgroup being adjusted to start from a different position relative to the multiple of the finder link circuits connected to them, said finder link circuits being also divided into corresponding subgroups and the associated group selectors adjusted to start from different home positions with respect to the multiple of the line finders connected to them, means in the starting circuit to select the register link whose first finder switch has a home position nearest to the arc contact to which the calling starting circuit is connected, and which has a third finder switch nearest the finder link whose group selector has its home position nearest to the group of terminals to which the line finders serving the calling lines are connected.

12. The system according to claim 10, and in which the lines served by each group of line finders are divided into a plurality of subgroups and the line finders are divided into a corresponding number of subgroups, each having a different home position relative to the multiple of the lines in their arcs, so that the line finders of each subgroup start to hunt with preference over a particular subgroup of lines, signaling means in the starting circuits to indicate the particular subgroup in which a call has originated, means controlled by the signaling means to control the application of test potentials in the line finders of the group to give preference to those line finders whose home position is nearest the calling line.

13. In an automatic telecommunication system, a plurality of groups of lines, each group divided into a plurality of subgroups, a group of control circuits common to several groups of lines, each control circuit comprising a register, automatic connecting equipments, a plurality of register link circuits connected between said automatic equipments and said registers, a starting circuit, a switch having a set of permanently rotating wipers connected with the starting circuit and a terminal bank divided into subgroups and in which the subgroups of a group of lines terminate, a detecting unit in each starting circuit for each subgroup of lines and responsive to the detection of the calling line in the subgroup, means controlled by a starting circuit for taking into use a free register, means including the actuated detecting unit for variably operating said register to indicate the designation of the calling line, and means controlled by the register for operating said connecting equipment to connect the selected register with the calling line.

14. In an automatic telecommunication system, a plurality of groups of lines, each group divided into a plurality of subgroups, a group of control circuits common to several groups of lines, each control circuit comprising a register, automatic connecting equipments, a plurality of register link circuits for connecting an idle register with a calling line, a starting circuit, a switch having a set of permanently rotating wipers connected with the starting circuit and a terminal bank divided into subgroups and in which the subgroups of a group of lines terminate, a detecting unit in each starting circuit for each subgroup of lines and responsive to the detection of the calling line in the subgroup, means including the actuated detecting unit for variably operating a register in accordance with the designation of the subgroup of the calling line, overflow means operable when more than a call in a subgroup is waiting for a register for associating a second calling line in the same subgroup with the detecting unit provided for a different subgroup in the starting circuit, and means controlled by the register for operating said connecting equipment to connect the selected register with the calling line.

JAKOB KRUITHOF.
LADISLAS KOZMA.

REFERENCES CITED

The following references are of record in the file of this patent:

UNITED STATES PATENTS

| Number | Name | Date |
|---|---|---|
| 1,714,718 | Mercer | May 28, 1929 |
| 1,767,861 | Stehlik | June 24, 1930 |
| 1,829,774 | Wright | Nov. 3, 1931 |
| 1,845,604 | Johnson | Feb. 16, 1932 |
| 1,851,482 | Baker | Mar. 29, 1932 |
| 1,857,833 | Baker et al. | May 10, 1932 |
| 1,903,019 | Wright et al. | Mar. 28, 1933 |
| 1,984,060 | Deakin | Dec. 11, 1934 |
| 2,081,027 | Wicks | May 18, 1937 |
| 2,169,302 | Taylor et al. | Aug. 15, 1939 |
| 2,201,651 | Hatton et al. | May 21, 1940 |
| 2,424,585 | Simon et al. | July 29, 1947 |
| 2,444,065 | Pouliart | June 29, 1948 |
| 2,452,578 | Kruithof et al. | Nov. 2, 1948 |
| 2,454,809 | Kruithof et al. | Nov. 30, 1948 |